(12) United States Patent
Redon et al.

(10) Patent No.: US 6,469,879 B1
(45) Date of Patent: Oct. 22, 2002

(54) MAGNETO-RESISTIVE TUNNEL JUNCTION HEAD WITH BIASING ELEMENTS ABUTTING FREE LAYER EXTENDED PORTIONS

(75) Inventors: Olivier Redon; Koji Shimazawa; Noriaki Kasahara; Satoru Araki, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/517,455

(22) Filed: Mar. 2, 2000

(30) Foreign Application Priority Data

Jun. 18, 1999 (JP) .......................................... 11-171869

(51) Int. Cl.$^7$ ................................................. G11B 5/39
(52) U.S. Cl. .................................................... 360/324.2
(58) Field of Search ........................ 360/324.2, 324.12, 360/324.11, 324.1

(56) References Cited

U.S. PATENT DOCUMENTS

| | | | |
|---|---|---|---|
| 5,159,513 A | | 10/1992 | Dieny et al. |
| 5,366,815 A | | 11/1994 | Araki et al. |
| 5,510,172 A | | 4/1996 | Araki et al. |
| 5,514,452 A | | 5/1996 | Araki et al. |
| 5,657,190 A | | 8/1997 | Araki et al. |
| 5,661,449 A | | 8/1997 | Araki et al. |
| 5,729,410 A | | 3/1998 | Fontana, Jr. et al. |
| 5,736,236 A | | 4/1998 | Araki et al. |
| 5,783,284 A | | 7/1998 | Shinjo et al. |
| 5,789,069 A | | 8/1998 | Araki et al. |
| 5,798,896 A | | 8/1998 | Araki et al. |
| 5,862,022 A | | 1/1999 | Noguchi et al. |
| 5,874,886 A | | 2/1999 | Araki et al. |
| 5,923,504 A | | 7/1999 | Araki et al. |
| 5,936,293 A | * | 8/1999 | Parkin |
| 5,958,611 A | | 9/1999 | Ohta et al. |
| 5,968,676 A | | 10/1999 | Araki et al. |
| 5,986,858 A | * | 11/1999 | Sato et al. |
| 6,004,654 A | | 12/1999 | Shinjo et al. |
| 6,153,319 A | * | 11/2000 | Hasegawa |
| 6,198,608 B1 | * | 3/2001 | Hong et al. ............. 360/324.12 |
| 6,249,407 B1 | * | 6/2001 | Aoshima et al. ......... 360/324.2 |
| 6,327,107 B1 | * | 12/2001 | Komuro et al. .......... 360/324.2 |
| 6,330,136 B1 | * | 12/2001 | Wang et al. ............. 360/324.2 |

OTHER PUBLICATIONS

U.S. patent application Ser. No. 08/933,347, filed Sep. 19, 1997, pending.
U.S. patent application Ser. No. 09/263,778, filed Mar. 5, 1999, pending.
U.S. patent application Ser. No. 09/368,672, filed Aug. 5, 1999, pending.
U.S. patent application Ser. No. 09/433,217, filed Nov. 4, 1999, pending.
U.S. patent application Ser. No. 09/498,349, filed Feb. 4, 2000, pending.

(List continued on next page.)

Primary Examiner—Craig A. Renner
(74) Attorney, Agent, or Firm—Oblon, Spivak, McClelland, Maier & Neustadt, P.C.

(57) ABSTRACT

Magneto-resistive tunnel junction head having a tunnel multilayered film with a tunnel barrier layer, a ferromagnetic free layer, and a ferromagnetic pinned layer formed as a sandwich. A magnetic field is applied to the free layer in a longitudinal direction by biasing elements at opposite ends, and a length of the free layer is greater than a length of the pinned layer such that the free layer has portions extending beyond opposite ends of the pinned layer. A head output suitable for ultra-high density recording can be obtained with less reduction of TMR ratio. Selection of the biasing element is flexible. A hard material and also an antiferromagnetic material can be selected and the biasing elements can be disposed on either an upper or lower side of the free layer at a desired distance.

14 Claims, 7 Drawing Sheets

OTHER PUBLICATIONS

U.S. patent application Ser. No. 09/425,967, filed Oct. 21, 1999, pending.
U.S. patent application Ser. No. 09/425,200, filed Oct. 20, 1999, pending.
U.S. patent application Ser. No. 09/027,187, filed Feb. 20, 1998, pending.
U.S. patent application Ser. No. 09/517,455, filed Mar. 2, 2000, pending.
U.S. patent application Ser. No. 09/118,363, filed Jul. 17, 1998.
U.S. patent application Ser. No. 09/259,327, filed Mar. 1, 1999, pending.
U.S. patent applicaton Ser. No. 09/260,727, filed Mar. 2, 1999, pending.
U.S. patent application Ser. No 09/260,722, filed Mar. 2, 1999, pending.
U.S. patent application Ser. No. 09/289,939, filed Apr. 13, 1999, pending.
U.S. patent application Ser. No. 09/325,394, filed Jun. 4, 1999, pending.
U.S. patent application Ser. No. 09/438,368, filed Nov. 12, 1999, pending.
U.S. patent application Ser. No. 09/515,327, filed Feb. 29, 2000, pending.
U.S. patent application Ser. No. 09/517,570, filed Mar. 2, 2000, pending.
U.S. patent application Ser. No. 09/517,455, filed Mar. 2, 2000, pending.
U.S. patent application Ser. No. 09/517,580, filed Mar. 2, 2000, pending.

* cited by examiner

RESISTANCE $R_p$

RESISTANCE $R_m$

RESISTANCE $R_{ap}$

RESISTANCE R'p

RESISTANCE R'ap

MAGNETO-RESISTIVE TUNNEL JUNCTION HEAD WITH BIASING ELEMENTS ABUTTING FREE LAYER EXTENDED PORTIONS

BACKGROUND OF THE INVENTION

1. Field of the Invention

The present invention relates to a magneto-resistive tunnel junction head for reading the magnetic field intensity from a magnetic recording medium or the like as a signal and, in particular, to a magneto-resistive tunnel junction head which has a new design of biasing means for improving an output for adaptation to ultra-high density recording and is excellent in flexibility of selection of the biasing means.

2. Description of the Prior Art

MR sensors based on the anisotropic magneto-resistance (AMR) or spin-valve (SV) effect are widely known and extensively used as read transducers in magnetic recording. MR sensors can probe the magnetic stray field coming out from transitions recorded on a recording medium by the resistance changes of a reading portion formed of magnetic materials. AMR sensors have quite a low resistance change ratio $\Delta R/R$, typically from 1 to 3%, whereas the SV sensors have a $\Delta R/R$ ranging from 2 to 7% for the same magnetic field excursion. The SV magnetic read heads showing such high sensitivity are progressively supplanting the AMR read heads to achieve very high recording density, namely over several Giga bits per square inch (Gbits/in$^2$).

Recently, a new MR sensor has attracted attention for its application potential in ultra-high density recording. Magneto-resistive tunnel junctions (MRTJ, or synonymously referred to as TMR) are -reported to have shown a resistance change ratio $\Delta R/R$ over 12%. Although it has been expected that TMR sensors replace SV sensors in the near future as the demand for ultra-high density is ever growing, an application to the field of the magnetic heads has just started, and one of the outstanding objects is to develop a new head structure which can maximize the TMR properties. Great efforts of developments are still needed to design a new head structure since TMR sensors operate in CPP (Current Perpendicular to the Plane) geometry, which means that TMR sensors requires the current to flow in a thickness direction of a laminate film.

In a basic SV sensor which has been developed for practical applications, two ferromagnetic layers are separated by a non-magnetic layer, as described in U.S. Pat. No. 5,159,513. An exchange layer (FeMn) is further provided so as to be adjacent to one of the ferromagnetic layers. The exchange layer and the adjacent ferromagnetic layer are exchange-coupled so that the magnetization of the ferromagnetic layer is strongly pinned (fixed) in one direction. The other ferromagnetic layer has its magnetization which is free to rotate in response to a small external magnetic field. When the magnetization's of the ferromagnetic layers are changed from a parallel to an antiparallel configuration, the sensor resistance increases and a $\Delta R/R$ in the range of 2 to 7% is observed.

In comparison between the SV sensor and the TMR sensor, the structure of the TMR is similar to the SV sensor except that the non-magnetic layer separating the two ferromagnetic layers is replaced by a tunnel barrier layer being an insulating layer and that the sense current flows perpendicular to the surfaces of the ferromagnetic layers. In the TMR sensor, the sense current flowing through the tunnel barrier layer is strongly dependent upon a spin-polarization state of the two ferromagnetic layers. When the magnetization's of the two ferromagnetic layers are antiparallel to each other, the probability of the tunnel current is lowered, so that a high junction resistance is obtained. On the contrary, when the magnetization's of the two ferromagnetic layers are parallel to each other, the probability of the tunnel current is heightened and thus a low junction resistance is obtained.

U.S. Pat. No. 5,729,410 discloses an example wherein a TMR sensor (element) is applied to a magnetic head structure. The TMR sensor is sandwiched between two parallel electrical leads (electrodes), that are in turn sandwiched between first and second insulating gap layers to form a read gap. A pair of permanent magnets are formed to secure a single magnetic domain structure of a free layer so as to suppress generation of the Barkhausen noises. In this case, attention is paid to avoiding a contact between the pair of permanent magnets and the TMR sensor portion so as to prevent an electrical short circuit of an insulating barrier.

However, the TMR head structure proposed in U.S. Pat. No. 5,729,410 has problems that since the permanent magnet and the free layer are formed with a given distance therebetween, the bias effect is reduced, and that the biasing means are limited to permanent magnets due to magnetic separation between the biasing means and the free layer.

For solving the foregoing problems, the present inventors have attempted to design one head structure which is shown in FIG. 6 in section. The TMR head 100 shown in FIG. 6 is provided with a TMR element 200 in the form of a laminate body comprising a ferromagnetic free layer 120, a tunnel barrier layer 130, a ferromagnetic pinned layer 140 and an antiferromagnetic pinning layer 150, and further provided with insulating layers 191 and 191 formed at opposite ends (left and-right sides in FIG. 6) of the element 200. Magnetization of the ferromagnetic pinned layer 140 is fixed in one direction (depth direction of the drawing sheet) by the antiferromagnetic pinning layer 150, while magnetization of the ferromagnetic free layer 120 can be rotated freely in response to an external signal magnetic field.

Further, on upper surfaces at opposite ends of the ferromagnetic free layer 120 located at the top of the TMR element 200, bias layers 161 and 161 in the form of permanent magnets are formed for applying a bias magnetic field in a direction of arrow α. Therefore, at portions of the ferromagnetic free layer 120 where the bias layers 161 and 161 abut the upper surfaces of the ferromagnetic free layer 120, the magnetization of the ferromagnetic free layer 120 is pinned in the direction of arrow a due to an exchange-coupling magnetic field. In FIG. 6, numerals 171 and 175 denote a pair of upper and lower electrodes, and numerals 181 and 185 denote a pair of upper and lower shield layers.

By adopting the head structure shown in FIG. 6, the problems generated in U.S. Pat. No. 5,729,410 could be solved. However, it was confirmed by the present inventors that new problems were generated in the head structure shown in FIG. 6.

Now, the ferromagnetic magneto-resistive tunnel effect (spin tunneling magneto-resistive effect) will be briefly explained. As the sense current is flowing perpendicularly to the surfaces of the TMR multilayered film 200, the conduction electrons are spin-polarized when they experienced the first ferromagnetic layer (20 or 40 depending on the current flowing direction). The probability of tunneling through the tunnel barrier layer is thus spin-dependent and depends upon the relative orientation of the two ferromagnetic layers 20 and 40 sandwiching the tunnel barrier layer. As illustrated in FIG. 5A, when the ferromagnetic layers 20 and 40 are parallel in magnetization to each other (or the relative magnetization angle therebetween is small), the density of states of majority spins is high in both layers, resulting in a high probability of electron tunneling through the tunnel barrier layer and a low junction resistance $R_p$. In constrast with this, as illustrated in FIG. 5C, when the ferromagnetic layers 20 and 40 are antiparallel in magnetization to each other (or the relative angle of magnetization therebetween is large), the density of states of majority spins is very different in each ferromagnetic layer, resulting in a low probability of electron tunneling through the tunnel barrier layer and a high junction resistance $R_{ap}$. In the intermediate state between the state shown in FIG. 5A and the state shown in FIG. 5C, i.e. when both ferromagnetic layers are orthogonal in magnetization to each other, a resistance value Rm takes a value between the resistance value Rp and the resistance value Rap so that a relation of Rp<Rm<Rap is satisfied.

It was found through experiments implemented by the present inventors that an unfavorable phenomenon as shown in FIGS. 7A and 7B was generated between the ferromagnetic pinned layer and the ferromagnetic free layer in the head structure shown in FIG. 6. Specifically, as shown in FIG. 7A, when the magnetization directions of the ferromagnetic pinned layer 140 and the free layer 120 are basically parallel to each other, magnetization in both end portions 120a and 120a of the free layer 120 corresponding to regions "a" in FIGS. 6 and 7A is fixed in the direction of arrow α due to the exchange-coupling relative to the bias layers as described above. If a sense current i is caused to flow in the laminate direction in this state, the current mainly flows at the center portions of the layers corresponding to region "b" in FIGS. 6 and 7A where the magnetization directions are parallel to each other and thus the resistance is small. The total resistance value at this time is given by R'p. On the other hand, as shown in FIG. 7B, when the magnetization directions of the ferromagnetic pinned layer 140 and the free layer 120 are basically antiparallel to each other (also in this case, the magnetization in the end portions 120a and 120a of the free layer 120 is fixed in the direction of arrow α due to the exchange-coupling relative to the bias layers as described above), if a sense current i is caused to flow in the laminate direction, the current does not mainly flow at the antiparallel center portions of the layers, but branches to mainly flow at both end portions where the resistance is small (currents is and is). The total resistance value in FIG. 7B is given by R'ap.

The resistance change ratio ((R'ap–R'p)/R'p) upon transition from the state of FIG. 7B to the state of FIG. 7A is smaller than the resistance change ratio ((Rap–Rp)/Rp) upon transition from the state of FIG. 5C to the state of FIG. 5A. As a result, there is raised a serious problem that the TMR (change) ratio is considerably lowered.

The present invention has been made under these circumstances and has an object to provide a magneto-resistive tunnel junction (TMR) head which can prevent the foregoing phenomenon wherein the current does not mainly flow at the antiparallel center portions of the layers but branches to mainly flow at both end portions where the resistance is low (the present inventors call this phenomenon "extra current channel effect" or "three current channel effect"), so as to achieve a high head output for adaptation to ultrahigh density recording with less reduction in TMR ratio.

Another object of the present invention is to provide a magneto-resistive tunnel junction head which is excellent in flexibility of selection of biasing means.

SUMMARY OF THE INVENTION

For solving the foregoing problems, according to one aspect of the present invention, there is provided a magneto-resistive tunnel junction head having a tunnel multilayered film composed of a tunnel barrier layer, and a ferromagnetic free layer and a ferromagnetic pinned layer formed to sandwich the tunnel barrier layer therebetween, wherein the ferromagnetic free layer is applied with a bias magnetic field in a longitudinal direction thereof by biasing means disposed at and connected to longitudinal opposite ends thereof, and wherein a length of the ferromagnetic free layer in the longitudinal direction (bias magnetic field applying direction) thereof was set to be greater than a longitudinal length of the ferromagnetic pinned layer such that the ferromagnetic free layer is provided at the longitudinal opposite ends thereof with extended portions extending further beyond longitudinal opposite ends of the ferromagnetic pinned layer.

It is preferable that the biasing means located at the longitudinal opposite ends of the ferromagnetic free layer are contacted with upper or lower portions of the extended portions located at the longitudinal opposite ends of the ferromagnetic free layer, and that each of the biasing means is located with a predetermined space (D) from corresponding one of the longitudinal opposite ends of the ferromagnetic pinned layer.

It is preferable that the space (D) is set to a length which does not substantially lower a TMR ratio characteristic.

It is preferable that the space (D) is set to no less than 0.02 μm.

It is preferable that the space (D) is set to no less than 0.02 μm and no greater than 0.3 μm.

It is preferable that the space (D) is set to no less than 0.02 μm and less than 0.15 μm.

It is preferable that the ferromagnetic free layer has a thickness of 20 Å to 500 Å.

It is preferable that the tunnel multilayered film has a multilayered film detection end surface constituting an air bearing surface (ABS).

It is preferable that the ferromagnetic free layer is a synthetic ferrimagnet.

It is preferable that each of the biasing means is made of a highly coercive material or an antiferromagnetic material, or in the form of a laminate body having an antiferromagnetic layer and at least one ferromagnetic layer.

It is preferable that a pinning layer for pinning magnetization of the ferromagnetic pinned layer is stacked on a surface of the ferromagnetic pinned layer remote from a side thereof abutting the tunnel barrier layer.

It is preferable that the tunnel multilayered film is electrically contacted with a pair of electrodes which are disposed to sandwich the tunnel multilayered film therebetween.

It is preferable that a pair of shield layers are formed to sandwich the pair of electrodes therebetween.

It is preferable that longitudinal opposite ends of the tunnel multilayered film are insulated by insulating layers.

DETAILED DESCRIPTION OF THE INVENTION

Hereinbelow, the present invention will be described in terms of preferred embodiments with reference to the accompanying drawings.

Figure 1:
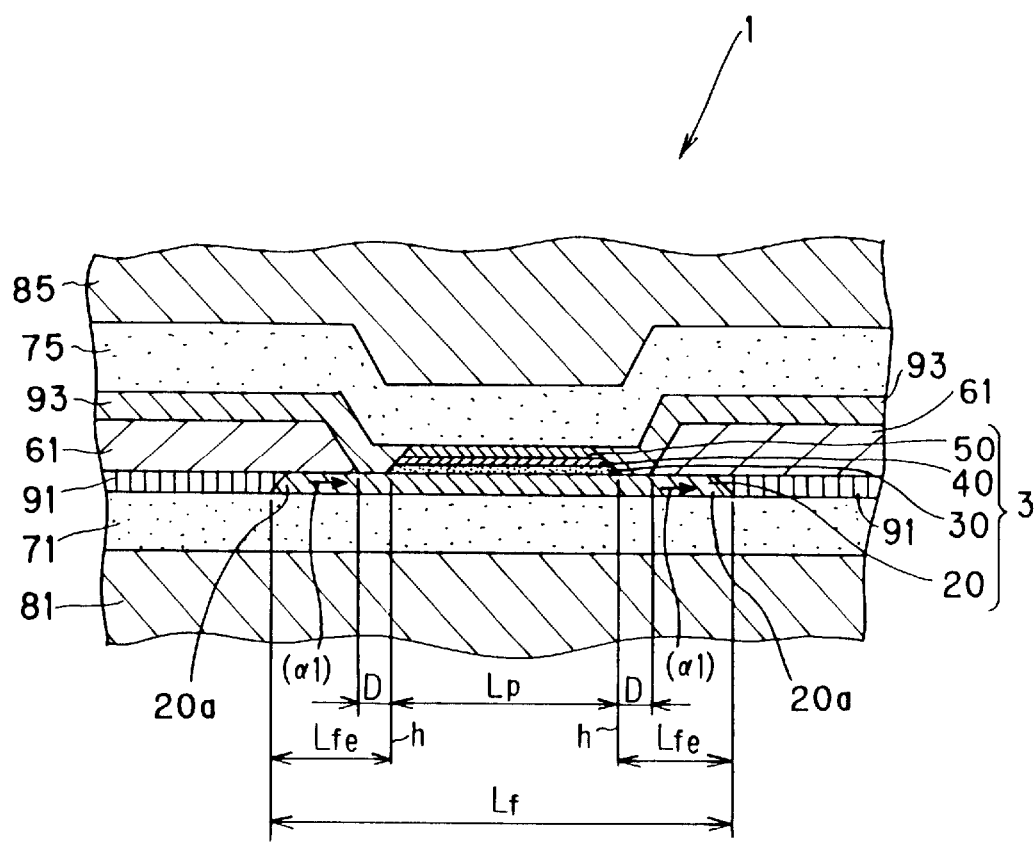
FIG. 1 is a sectional view showing a magneto-resistive tunnel junction head according to a preferred embodiment of the present invention.

FIG. 1 is a sectional view showing a magneto-resistive tunnel junction head (hereinafter simply referred to as "TMR head") 1 according to a preferred embodiment of the present invention. This sectional view corresponds to a surface (ABS: Air Bearing Surface) that is located in a confronting relationship to a magnetic recording medium which produces an external magnetic field as magnetic information.

In this embodiment, the TMR head 1 has a tunnel multilayered film 3 which exhibits a magneto-resistive spin tunnel effect (spin tunneling magneto-resistive effect). Specifically, the tunnel multilayered film 3 has a laminate structure composed of a tunnel barrier layer 30, a ferromagnetic free layer 20 formed on one surface of the tunnel barrier layer 30, and a ferromagnetic pinned layer 40 formed on the other surface of the tunnel barrier layer 30 so that the tunnel barrier layer 30 is held between the layers 20 and 40. The ferromagnetic free layer 20 can basically change its magnetization direction freely in response to an external magnetic field as magnetic information. On the other hand, the ferromagnetic pinned layer 40 is pinned such that its magnetization direction is entirely fixed in one direction (in FIG. 1, the pinned magnetization direction is in a depth direction of the drawing sheet). Thus, as shown in FIG. 1, a pinning layer 50 for pinning the magnetization of the ferromagnetic pinned layer 40 is stacked on a surface of the ferromagnetic pinned layer 40 remote from a surface thereof abutting the tunnel barrier layer 30.

The tunnel multilayered film 3 is preferably formed such that its multilayered film detection end surface constitutes an ABS (Air Bearing Surface). Specifically, it is preferable that respective detection end surfaces of the ferromagnetic free layer 20, the tunnel barrier layer 30 and the ferromagnetic pinned layer 40 are exposed to constitute the same head end surface. This structure allows reduction of loss in tunnel effects as compared with a structure in which, for example, the end surface of only the ferromagnetic free layer 20 is exposed at the end surface of the head, thus resulting in greater TMR ratio.

As shown in FIG. 1, the ferromagnetic free layer 20 in the present invention is formed such that a bias magnetic field (for example, in the direction of arrow α1) is applied in the longitudinal direction of the ferromagnetic free layer 20 by biasing means 61 and 61 which are stacked at longitudinally opposite ends (left and right directions of the drawing sheet) of the ferromagnetic free layer 20.

A length $L_f$ in the longitudinal direction (substantially the same as the bias magnetic field applying direction) of the ferromagnetic free layer 20 is set to be greater than a longitudinal length $L_p$ of the ferromagnetic pinned layer 40. The ferromagnetic free layer 20, which is longer than the ferromagnetic pinned layer 40 as described above, has extended portions 20a extending further beyond the longitudinal ends (designated by lines h) of the ferromagnetic pinned layer 40. Each of the extended portions 20a has a length $L_{fe}$ and occupies a part of the ferromagnetic free layer 20, which means that the extended portion 20a is synonymous to a projected length extending further from the end of the ferromagnetic pinned layer 40.

The longitudinal length $L_f$ of the ferromagnetic free layer 20 is set to be in the range of 0.5 μm to 20 μm. The length $L_{fe}$ of the extended portion 20a of the ferromagnetic free layer 20, which is determined in relation to the longitudinal length $L_p$ of the ferromagnetic pinned layer 40, is set to be in the range of 0.1 μm to 5 μm.

The foregoing biasing means 61 and 61 are contacted in a laminate state with the extended portions 20a and 20a at the opposite ends of the ferromagnetic free layer 20. Since the biasing means 61 and 61 are in exchange-coupling to the extended portions 20a and 20a, the magnetization direction is fixed in the direction shown by arrow α1. Each of the biasing means 61 and 61 is formed such that a predetermined space D is maintained from the corresponding longitudinal end of the ferromagnetic pinned layer 40, as shown in FIG. 1.

The space D is necessary for preventing an influence of "extra current channel effect" or "three current channel effect" being the conventional problem found by the present inventors so as to avoid lowering of the TMR ratio. Upon determining the head specification, the value of D should be set to a length which does not cause substantial lowering of the TMR ratio characteristics. It is preferable that the specific value is set depending on the head specification, such as materials and dimensions of components to be used. As a preferred example, the space D is set to be no less than 0.02 μm, particularly in the range of 0.02 μm to 0.3 μm, and more preferably, in the range of 0.02 μm to less than 0.15 μm. If the value of D is less than 0.02 μm, the foregoing "extra current channel effect" phenomenon tends to be caused to lower the TMR ratio. In contrast, if the value of D increases to exceed 0.3 μm, an effective track width is unfavorably expanded to result in failure to meet with the requirement of high density recording in the future. If a concentrated attention is paid to the effective track width, the D value is preferably set to be in the range of no less than 0.02 μm to less than 0.15 μm.

The thickness of the ferromagnetic free layer 20 in the present invention is set to be 20 Å to 500 Å, preferably 40 Å to 300 Å, and more preferably 60 Å to 200 Å. If the thickness is less than 20 Å, it is difficult to set the length $L_f$ of the ferromagnetic free layer 20 to be sufficiently large in view of the film formation technique. If the thickness exceeds 500 Å, dispersion of electronic polarizability is produced due to property variance within the ferromagnetic free layer, resulting in reduction of the TMR ratio.

The entire structure of the TMR head 1 will be briefly explained. The tunnel multilayered film 3 is electrically contacted with a pair of electrodes 71 and 75 which are disposed so as to sandwich the tunnel multilayered film 3 therebetween in upper/lower directions in FIG. 1. Further, a pair of shield layers 81 and 85 are formed so as to sandwich the pair of electrodes 71 and 75 therebetween in upper/lower directions in FIG. 1 so that a gap length is determined. In this embodiment, insulating layers 91 and 91 are externally formed on the opposite ends of the ferromagnetic free layer 20 as shown in FIG. 1. Further, insulating layers 93 and 93 are formed on the biasing means 61 and 61 and further enter the spaces D, respectively. With this arrangement, the biasing means 61 and 61-are fully insulated from the tunnel barrier layer 30.

Each of the ferromagnetic free layer 20 and the ferromagnetic pinned layer 40 is made preferably of a high spin polarization material, such as Fe, Co, Ni, FeCo, NiFe, CoZrNb or FeCoNi for the purpose of obtaining the high TMR ratio. It may be in the form of a laminate body having two or more layers. The thickness of the ferromagnetic free layer 20 is set to be 20 Å to 500 Å, preferably 60 Å to 200 Å. An excessive thickness of the layer 20 tends to result in lowering of an output at the time of head operation and, in contrast, if it is thinner than required, magnetic properties become unstable to result in increase of noise at the time of head operation. The thickness of the A ferromagnetic pinned layer 40 is set to be 10 Å to 100 Å, preferably 20 Å to 50 Å. If the thickness is more than required, the pinning of magnetization by the pinning layer 50 is weakened and, on the other hand, if it is less than required, the TMR ratio tends to reduce.

The pinning layer 50 for pinning the magnetization of the ferromagnetic pinned layer 40 is normally made of an antiferromagnetic material, although not limited thereto as long as exhibiting a pinning function. The thickness of the pinning layer 50 is normally set in the range of 60 Å to 200 Å.

Figure 5A:
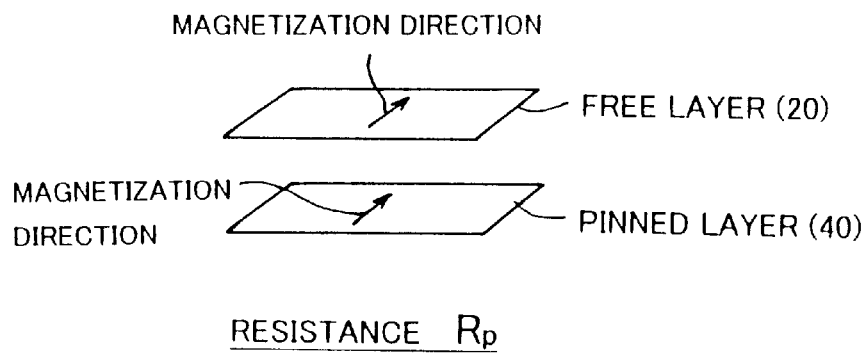
FIGS. 5A to 5C are diagrams for explaining a magneto-resistive tunnel effect according to the present invention.
Figure 5B:
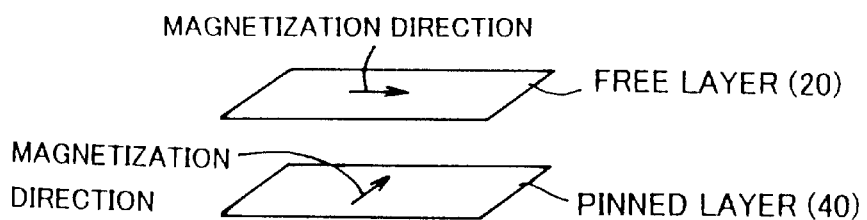
Figure 5C:
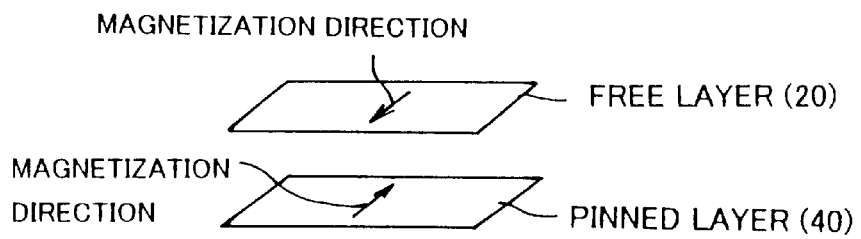

Now, the magneto-resistive tunnel effect (spin tunneling magneto-resistive effect) will be briefly explained with reference to FIGS. 1, and 5A–5C. As the sense current is flowing perpendicularly to the surfaces of the TMR multilayered film 3, the conduction electrons are spin-polarized when they experienced the first ferromagnetic layer (20 or 40 depending on the current flowing direction). The probability of tunneling through the tunnel barrier layer 30 is thus spin-dependent and depends upon the relative orientation of the two ferromagnetic layers 20 and 40 sandwiching the tunnel barrier layer 30. As illustrated in FIG. 5A, when the ferromagnetic layers 20 and 40 are parallel in magnetization to each other (or the relative magnetization angle therebetween is small), the density of states of majoraty spins is high in both layers, resulting in a high probability of electron tunneling through 30 and a low junction resistance. In constrast with this, as illustrated in FIG. 5C, when the ferromagnetic layers 20 and 40 are antiparallel in magnetization to each other (or the relative angle of magnetization therebetween is large), the density of states of majoratary spins is very different in each ferromagnetic layer, resulting in a low probability of electron tunneling through 30 and a high junction resistance. By utilizing the change in resistance depending on the change in relative magnetization angle, an external magnetic field is detected, for example.

The tunnel barrier layer 30 sandwiched between the two ferromagnetic layers 20 and 40 is formed of $Al_2O_3$, NiO, GdO, MgO, $Ta_2O_5$, $MoO_2$, $TiO_2$, $WO_2$ or the like. The thickness of the tunnel barrier layer 30 is desired to be as thin as possible for reducing the resistance of the element. However, if the thickness becomes too thin to cause pin holes, a leak current is generated, which is not preferable. In general, the thickness is set to about 5 Å to 20 Å.

Figure 3:
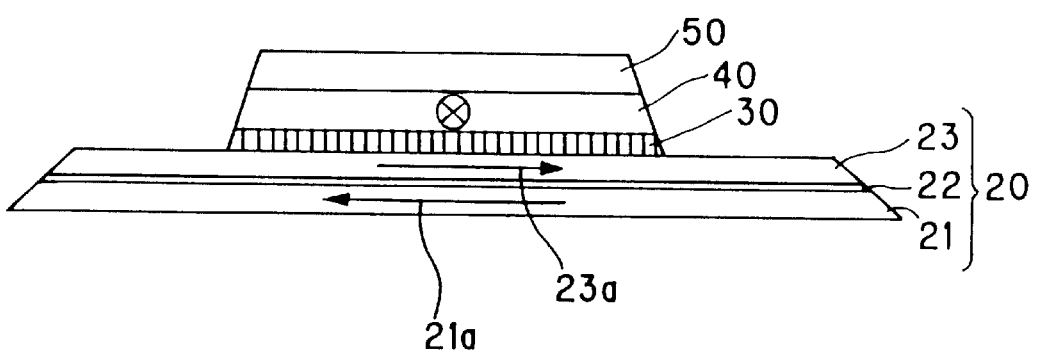
FIG. 3 is a sectional view of a tunnel multilayered film for explaining an example of a preferred ferromagnetic free layer to be used in a magneto-resistive tunnel junction head according to the present invention.

As one preferred example of the present invention, the ferromagnetic free layer 20 may be in the form of a synthetic ferrimagnet of a three-layered laminate body of NiFe layer 21 (20 Å in thickness)/Ru layer 22 (7 Å in thickness)/NiFe layer 23 (25 Å in thickness) as illustrated in FIG. 3. In this example, magnetization directions 21a and 23a of the NiFe layers 21 and 23 are opposite to each other. Using the synthetic ferrimagnet, the effective thickness of the free layer can be set thinner so that the magnetic field sensitivity is improved-to achieve an increased head output. Such a synthetic ferrimagnet may also be applied to the ferromagnetic pinned layer 40.

Figure 2:
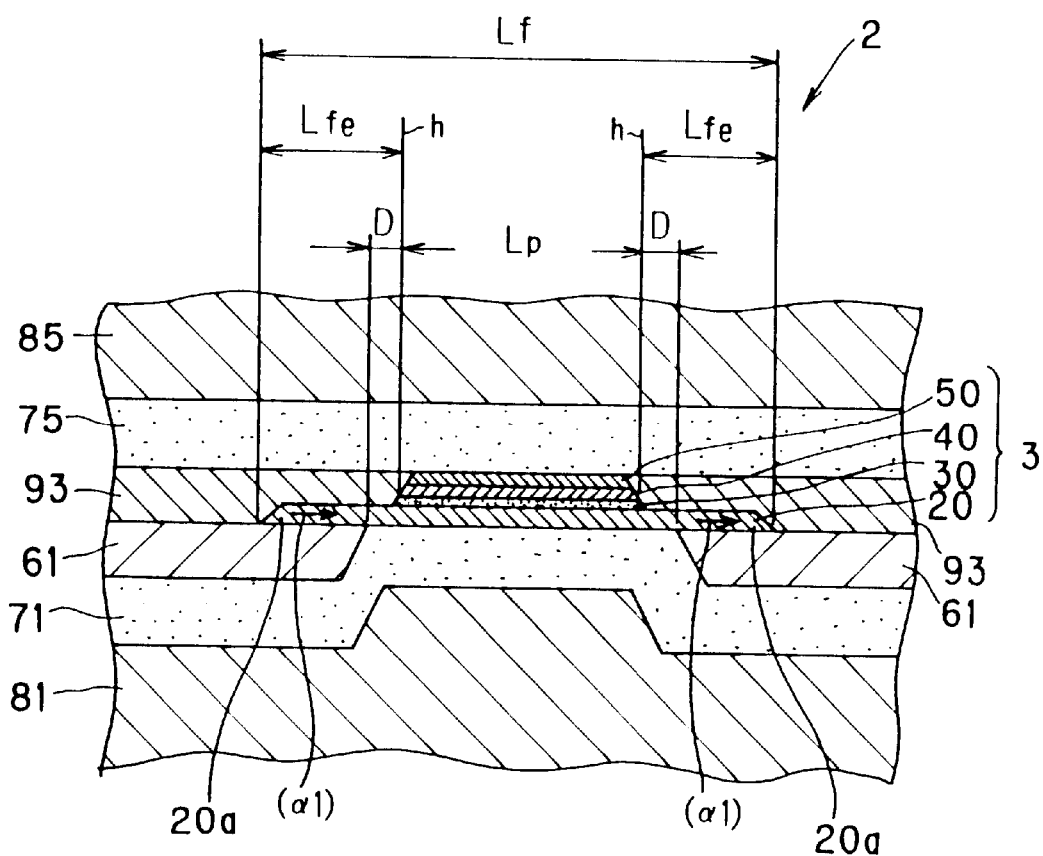
FIG. 2 is a sectional view showing a magneto-resistive tunnel junction head according to another preferred embodiment of the present invention.

FIG. 2 shows a TMR magnetic head 2 as a modification of the TMR magnetic head 1 shown in FIG. 1. The TMR magnetic head 2 basically differs from the TMR magnetic head 1 of FIG. 1 in location of the biasing means 61 and 61. Specifically, the biasing means 61 and 61 in FIG. 2 are disposed on lower portions at the opposite ends of the ferromagnetic free layer 20. Even in the embodiment of FIG. 2, it is necessary that the specifications of the ferromagnetic free layer 20, the ferromagnetic pinned layer 40 and the biasing means 61 and 61 be designed to satisfy the requirements similar to those of the embodiment of FIG. 1. In FIG. 2, it should be appreciated that the location of the insulating layers is changed in accordance with the modification in location of the biasing means 61 and 61.

The invention of the foregoing magneto-resistive tunnel junction head will be explained in further detail based on the following concrete experimental examples:

EXAMPLE I

A sample of a magneto-resistive tunnel junction head having the same structure as the embodiment shown in FIG. 1 was prepared. Specifically, a magnetic head sample having a tunnel multilayered film 3 was prepared, which was composed of a ferromagnetic free layer 20 of a two-layered laminate body of NiFe (100 Å in thickness) and Co (20 Å in thickness), a tunnel barrier layer 30 (aluminum oxide; 12 Å in thickness), a ferromagnetic pinned layer 40 (Co; 30 Å in thickness) whose magnetization is pinned in a detection magnetic field direction, and a pinning layer 50 (RuRhMn; 100 Å in thickness) for pinning the magnetization of the ferromagnetic pinned layer 40. Electrodes 71 and 75 for supplying a current to the tunnel multilayered film 3 were each made of Ta (300 Å in thickness), and magnetic shield layers 81 and 85 were each made of permalloy. On the longitudinal opposite ends of the ferromagnetic free layer 20, permanent magnets 61 and 61 of CoPt were provided in an overlapping fashion as biasing means. With the basing means 61 and 61, a bias magnetic field was applied to the ferromagnetic free layer 20 in the longitudinal direction thereof (e.g. in the direction of arrow α1). A junction distance of the overlapped portion was set to 0.5 μm, and a space value D was set to 0.02 Mm. Further, an $L_p$ value in FIG. 1 was set to 0.5 μm, and an $L_f$ value was set to 1.5 μm. The insulating layers 91 and 91 and the insulating layers 93 and 93 were the same in configuration as those shown in FIG. 1 and made of alumina.

Figure 6:
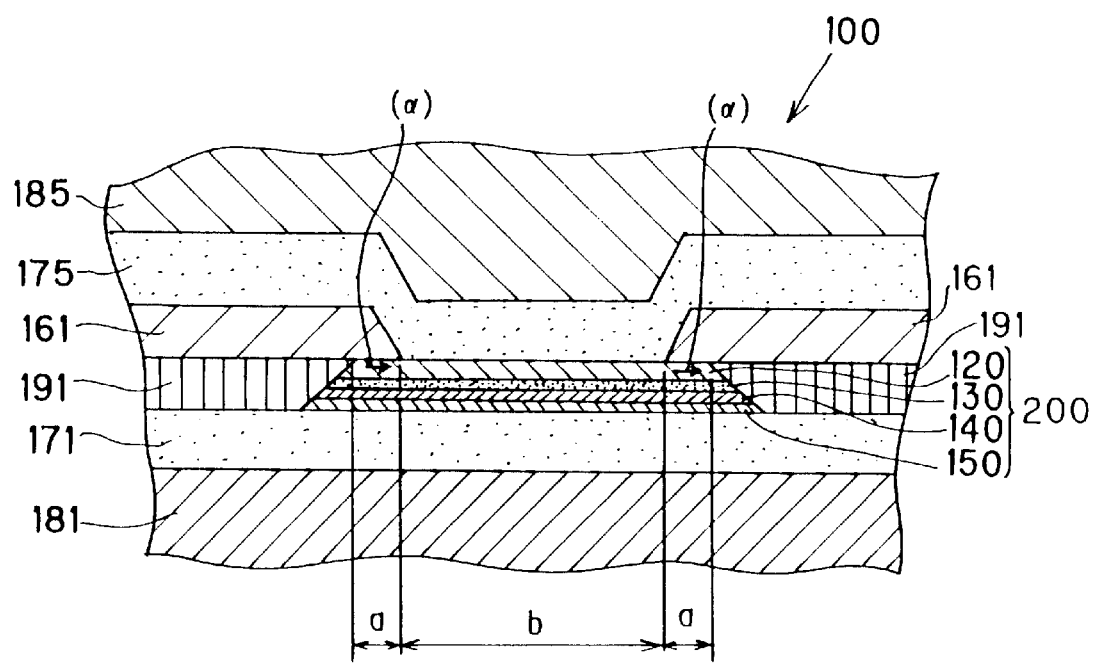
FIG. 6 is a sectional view of a conventional magneto-resistive tunnel junction head.
Figure 7A:
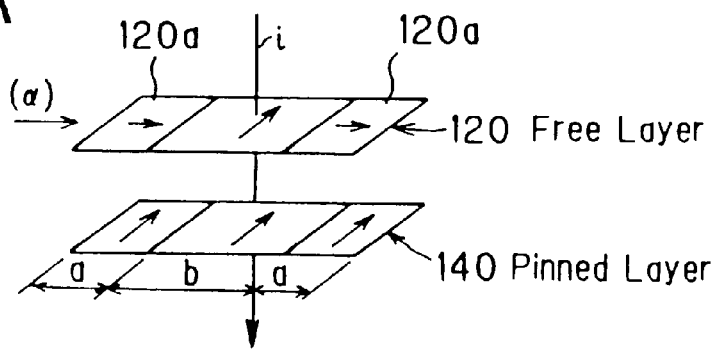
FIGS. 7A and 7B are diagrams for explaining a problem of the conventional head.
Figure 7B:
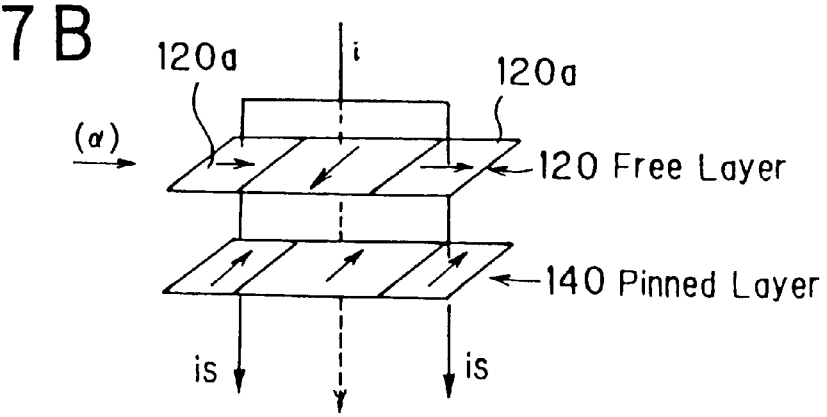

For comparison with the foregoing inventive sample, a magnetic head as shown in FIG. 6 was prepared as a comparative sample. Specifically, a magnetic head sample having a tunnel multilayered film 200 was prepared, which was composed of a ferromagnetic free layer 120 of a two-layered laminate body of NiFe (100 Å in thickness) and Co (20 Å in thickness), a tunnel barrier layer 130 (aluminum oxide; 12 Å in thickness), a ferromagnetic pinned layer 140 (Co; 30 Å in thickness) whose magnetization is pinned in a detection magnetic field direction, and a pinning layer 150 (RuRhMn; 100 Å in thickness) for pinning the magnetization of the ferromagnetic pinned layer 140. Electrodes 171 and 175 for supplying a current to the tunnel multilayered film 200 were each made of Ta (300 Å in thickness), and magnetic shield layers 181 and 185 were each made of permalloy. On the longitudinal opposite ends of the ferromagnetic free layer 120, permanent magnets 161 and 161 of CoPt were provided in an overlapping fashion as biasing means. With the basing means 161 and 161, a bias magnetic field was applied to the ferromagnetic free layer 120 in the longitudinal direction thereof (e.g. in the direction of arrow α). A junction distance of the overlapped portion was set to 0.1 μm. The bias direction length of the ferromagnetic free layer 120 in the comparative sample of FIG. 6 was substantially equal to or slightly shorter than that of the ferromagnetic pinned layer 140. The a/b ratio in FIG. 6 was set to 0.125.

With respect to the inventive sample and the comparative sample having the foregoing basic structures, various samples were prepared by changing thicknesses of the permanent magnets made of CoPt as the biasing means. By changing the bias magnetic field in the range of +5 Oe to +215 Oe, the TMR ratios relative to the bias magnetic fields were derived, then the relative TMRs were derived using as a reference the TMR ratio in case of the bias magnetic field being zero. The relationship between them is shown in a graph of FIG. 4. The measuring method of the TMR ratio is as follows:

(1) TMR Ratio (%)

A constant current was supplied so that a voltage applied to a sample became about 50 mV in the zero magnetic field. Then, a minimum resistance value Rmin was derived from a minimum voltage value upon applying a magnetic field of ±900 (Oe), and a maximum resistance value Rmax was derived from a maximum voltage value upon applying such a magnetic field. The TMR ratio (%) was derived from the following equation (1):

$$TMR\ ratio\ (\%) = (Rmax - Rmin)/Rmin \times 100 \qquad (1)$$

Figure 4:
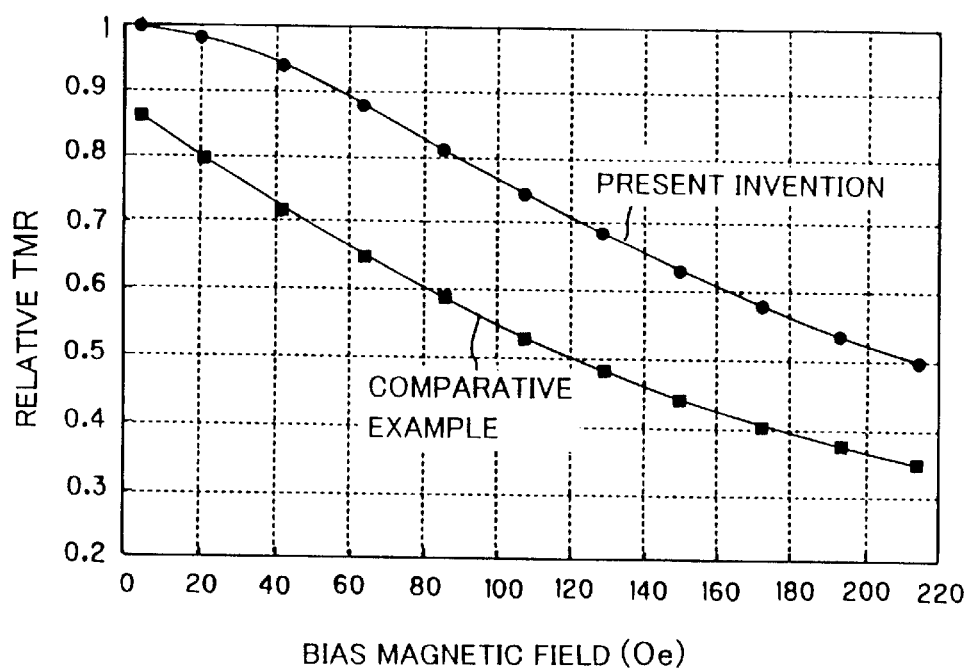
FIG. 4 is a graph showing a relationship between a bias magnetic field applied to a ferromagnetic free layer and relative TMR.

In the graph shown in FIG. 4, the bias magnetic field practically used is up to about 50 Oe. When comparing the TMR ratios at 50 Oe, for example, it is found that about 8% is reduced in the present invention, while as much as 31% is reduced in the comparative sample. Thus, the comparative sample has a fairly adverse configuration and is not preferable.

EXAMPLE II

A sample of a magneto-resistive tunnel junction head having the same structure as the embodiment shown in FIG. 1 was prepared. Specifically, a magnetic head sample having a tunnel multilayered film 3 was prepared, which was composed of a ferromagnetic free layer 20 of a two-layered laminate body of NiFe (100 Å in thickness) and Co (20 Å in thickness), a tunnel barrier layer 30 (aluminum oxide; 12 Å in thickness), a ferromagnetic pinned layer 40 (Co; 30 Å in thickness) whose magnetization is pinned in a detection magnetic field direction, and a pinning layer 50 (RuRhMn; 100 Å in thickness) for pinning the magnetization of the ferromagnetic pinned layer 40. Electrodes 71 and 75 for supplying a current to the tunnel multilayered film 3 were each made of Ta (300 Å in thickness), and magnetic shield layers 81 and 85 were each made of permalloy. On the longitudinal opposite ends of the ferromagnetic free layer 20, permanent magnets 61 and 61 of CoPt were provided in an overlapping fashion as biasing means. With the basing means 61 and 61, a bias magnetic field was applied to the ferromagnetic free layer 20 in the longitudinal direction thereof (e.g. in the direction of arrow α1). Various samples were prepared as shown in Table 1, with a junction distance of the overlapped portion being unchanged while variously changing a space value D only. The insulating layers 91 and 91 and the insulating layers 93 and 93 were the same in configuration as those shown in FIG. 1 and made of alumina.

With respect to these samples, (1) an effective track width $TW_{eff}$ and the foregoing TMR ratio were derived. (1) Effective Track Width $TW_{eff}$ (μm)

A definition was the same as that used in the normal AMR and GMR. Specifically, a microtrap profile was measured and its half width value was set to an effective track width $TW_{eeff}$ (μm)

The results are shown in Table 1.

TABLE 1

| Sample No. | Space D (μm) | Effective Track Width $TW_{eff}$ (μm) | TMR ratio (%) |
|---|---|---|---|
| II-1 | 0 | 0.4 | 14 |
| II-2 | 0.01 | 0.4 | 16 |
| II-3 | 0.02 | 0.42 | 18 |
| II-4 | 0.05 | 0.44 | 18 |
| II-5 | 0.1 | 0.48 | 18 |
| II-6 | 0.13 | 0.50 | 18 |
| II-7 | 0.15 | 0.52 | 18 |
| II-8 | 0.2 | 0.56 | 18 |
| II-9 | 0.3 | 0.64 | 18 |
| II-10 | 0.4 | 0.72 | 18 |
| II-11 | 0.5 | 0.8 | 18 |
| II-12 | 0.6 | 0.88 | 18 |

With respect to all the samples shown in Table 1, the ferromagnetic free layer 20 had a length $L_f$ which was set longer than a length $L_p$ of the ferromagnetic pinned layer 40, and was provided at longitudinal opposite ends thereof with extended portions 20a extending further beyond longitudinal opposite ends (designated by lines h) of the ferromagnetic pinned layer 40.

Among them, it is seen that the value of the space D should be preferably set to no less than 0.02 μm. If the value D becomes less than 0.02 μm, it is seen that TMR ratio is lowered though slightly. On the other hand, considering only the TMR ratio, there is no upper limit about the value D. However, if the value D exceeds 0.3 μm, the effective track width $TW_{eff}$ becomes large enough to make it difficult to respond to the demand for track narrowing corresponding to the high-density recording. The value D is preferably set to less than 0.15 μm.

As appreciated from the foregoing results, the effect of the present invention is clear. Specifically, the present invention is arranged such that, in the magneto-resistive tunnel junction head having the tunnel multilayered film composed of the tunnel barrier layer, and the ferromagnetic free layer and the ferromagnetic pinned layer formed to sandwich the tunnel barrier layer therebetween, the ferromagnetic free layer is applied with the bias magnetic field in the longitudinal direction thereof by the biasing means disposed at and connected to the longitudinal opposite ends thereof, and the length of the ferromagnetic free layer in the longitudinal direction (bias magnetic field applying direction) thereof was set to be greater than the longitudinal length of the ferromagnetic pinned layer such that the ferromagnetic free layer is provided at the longitudinal opposite ends thereof with the extended portions extending further beyond the longitudinal opposite ends of the ferromagnetic pinned layer. Therefore, the large head output suitable for the ultra-high density recording can be obtained with less reduction of the TMR ratio. Further, it is excellent in flexibility of selection of the biasing means. Specifically, from an aspect of the material, not only a hard material but also an antiferromagnetic material can be selected and, from an aspect of the structure, the biasing means can be disposed on either upper or lower side of the free layer with a desired distance therefrom so that the degree of freedom in location thereof is high.

What is claimed is:

1. A magneto-resistive tunnel junction head comprising:
   a tunnel multilayered film including,
   a tunnel barrier layer,
   a ferromagnetic free layer, and
   a ferromagnetic pinned layer formed to sandwich the tunnel barrier layer therebetween;
   the ferromagnetic free layer having an extended portion including an upper surface, a lower surface, and an end surface extending therebetween, said extended portion provided at least one longitudinal opposite end of the ferromagnetic free layer and extending beyond at least one longitudinal opposite end of the ferromagnetic pinned layer; and
   a biasing layer abutting at least one of the upper surface and the lower surface of said extended portion of said ferromagnetic free layer and configured to apply a bias magnetic field in a longitudinal direction of the ferromagnetic free layer.

2. The magneto-resistive tunnel junction head according to claim 2, wherein said biasing layer is located at a predetermined distance from a corresponding one of said at least one longitudinal opposite end of the ferromagnetic pinned layer.

3. The magneto-resistive tunnel junction head according to claim 1, wherein said predetermined distance is set to a length which does not substantially lower a TMR ratio characteristic.

4. The magneto-resistive tunnel junction head according to claim 3, wherein said predetermined distance is set to no less than 0.02 μm.

5. The magneto-resistive tunnel junction head according to claim 3, wherein said predetermined distance is set to no less than 0.02 μm and no greater than 0.3 μm.

6. The magneto-resistive tunnel junction head according to claim 3, wherein said predetermined distance is set to no less than 0.02, μm and less than 0.15 μm.

7. The magneto-resistive tunnel junction head according to claim 1, wherein said ferromagnetic free layer has a thickness of 20 Å to 500 Å.

8. The magneto-resistive tunnel junction head according to claim 1, wherein said tunnel multilayered film has a multilayered film detection end surface constituting an air bearing surface (ABS).

9. The magneto-resistive tunnel junction head according to claim 1, wherein said ferromagnetic free layer is a synthetic ferrimagnet.

10. The magneto-resistive tunnel junction head according to claim 1, wherein said biasing layer comprises a highly coercive material or an antiferromagnetic material, or comprises a laminate body having an antiferromagnetic layer and at least one ferromagnetic layer.

11. The magneto-resistive tunnel junction head according to claim 1, wherein a pinning layer for pinning magnetization of said ferromagnetic pinned layer is stacked on a surface of said ferromagnetic pinned layer remote from a side thereof abutting said tunnel barrier layer.

12. The magneto-resistive tunnel junction head according to claim 1, wherein said tunnel multilayered film is electrically contacted with a pair of electrodes which are disposed to sandwich said tunnel multilayered film therebetween.

13. The magneto-resistive tunnel junction head according to claim 12, wherein a pair of shield layers are formed to sandwich said pair of electrodes therebetween.

14. The magneto-resistive tunnel junction head according to claim 1, wherein longitudinal opposite ends of said tunnel multilayered film are insulated by insulating layers.

* * * * *